United States Patent [19]

Olson, Sr.

[11] 4,138,863
[45] Feb. 13, 1979

[54] UNIVERSAL JOINT CROSS WITH ADJUSTABLE BEARING CUPS

[75] Inventor: Dean A. Olson, Sr., Rockford, Ill.

[73] Assignee: Rockford Acromatic Products Co., Rockford, Ill.

[21] Appl. No.: 827,794

[22] Filed: Aug. 25, 1977

[51] Int. Cl.² .......................... F16D 3/30; F16D 3/26
[52] U.S. Cl. ..................................... 64/17 A; 64/17 R
[58] Field of Search .............................. 64/17 A, 17 R

[56] References Cited

U.S. PATENT DOCUMENTS

| 1,943,814 | 1/1934 | Cutting | 64/17 A |
| 2,037,947 | 4/1936 | Swenson | 64/17 A |
| 2,447,882 | 8/1948 | Warner | 64/17 A |
| 3,005,324 | 10/1961 | Zeller | 64/17 A |
| 3,585,816 | 6/1971 | Bail | 64/17 A |

FOREIGN PATENT DOCUMENTS 842164  6/1960  United Kingdom ................... 64/17 A Primary Examiner—Samuel Scott
Assistant Examiner—R. C. Turner
Attorney, Agent, or Firm—Leydig, Voit, Osann, Mayer & Holt, Ltd.

[57] ABSTRACT

Studs are threaded into the end walls of the bearing cups of a universal joint cross and may be adjusted into contact with the outer ends of the trunnions to take up axial end play between the bearings cups and the trunnions while avoiding axial pressure between the cups and the trunnions.

1 Claim, 5 Drawing Figures

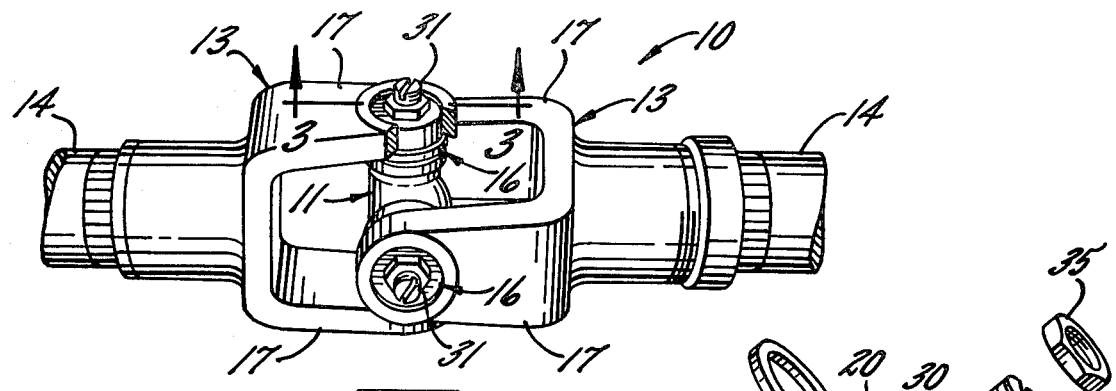
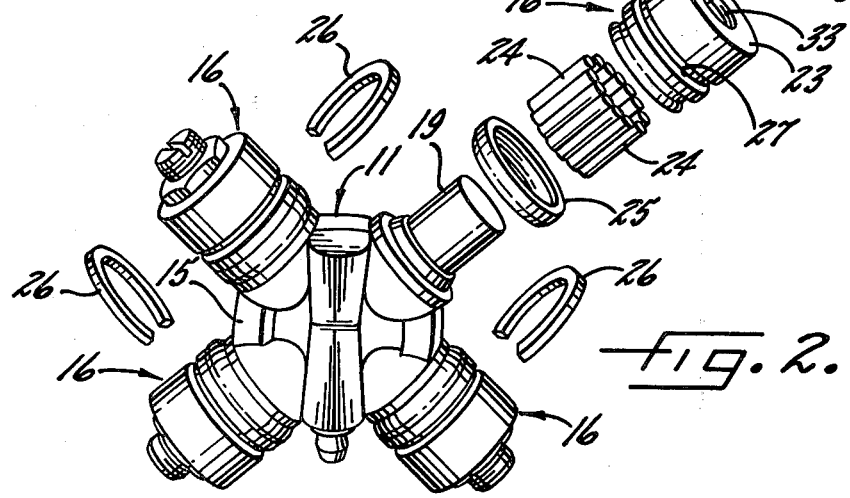
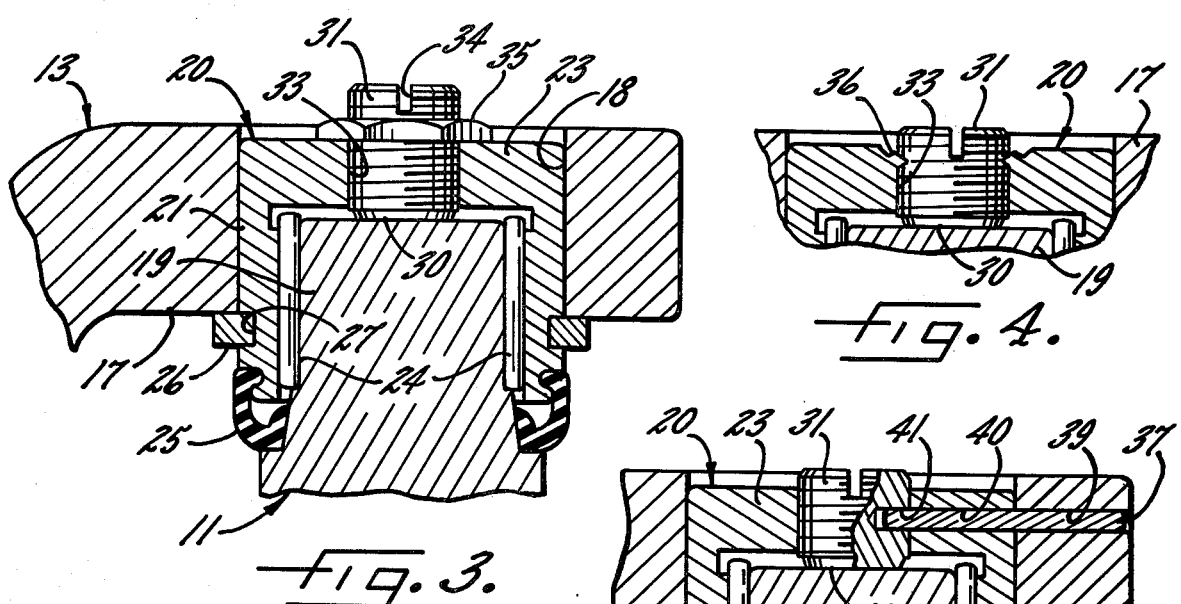
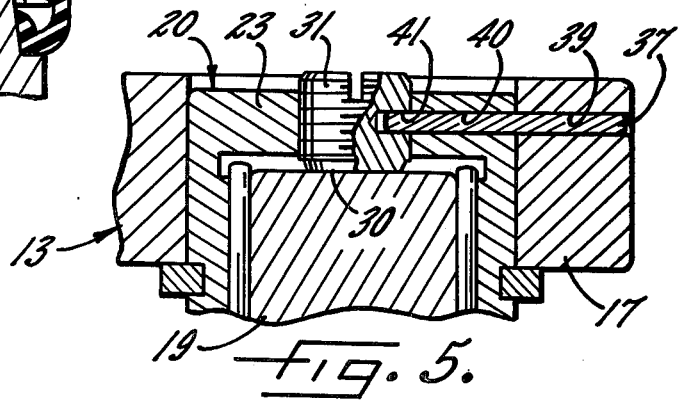

UNIVERSAL JOINT CROSS WITH ADJUSTABLE BEARING CUPS

BACKGROUND OF THE INVENTION

This invention relates to a universal joint cross of the type which is adapted to interconnect two right angular yokes located on the ends of rotatable shafts. Such a cross typically includes a central body having four angularly spaced and outwardly projecting trunnions. A bearing cup is telescoped slidably over each trunnion and is journaled thereon by an annular row of rollers. Each bearing cup includes an end wall which is located adjacent the outer end of the respective trunnion. In conventional crosses, the end wall of each cup defines a so-called pillow which is adapted to engage the outer end of the trunnion.

To connect the cross with the yokes, the bearing cups are pulled off of the trunnions of the cross and then the trunnions are slipped through holes in the yokes. Thereafter, the bearing cups are inserted into the holes in telescoping relation with the trunnions and then snap rings are placed around the cups, the snap rings engaging the yokes to prevent endwise removal of the cups from the trunnions.

When the cross is in its fully installed position, there should be virtually no end play and virtually no axial pressure between the bearing cups and the trunnions. Difficulty is encountered, however, in completely eliminating both end play and axial pressure even when the trunnions, the bearing cups and the yokes are manufactured by precision techniques since the accumulation of permissible tolerances can result in the end wall of each bearing cup either being spaced outwardly from or pressing too tightly against the outer end of the respective trunnion.

SUMMARY OF THE INVENTION

The general aim of the present invention is to provide a new and improved universal joint cross in which each bearing cup includes a unique pillow which may be adjusted to completely take up end play between the bearing cup and the trunnion while establishing only light axial contact between the two.

A more detailed object is to achieve the foregoing by providing a universal joint cross in which a stud is threaded into the end wall of each bearing cup and defines the pillow of the cup, the stud being adjustable into light engagement with the outer end of the respective trunnion to take up end play between the trunnion and the bearing cup in an optimum manner.

The invention also resides in the provision of means for locking the stud against turning after the stud has been adjusted into engagement with the trunnion.

These and other objects and advantages of the invention will become more apparent from the following detailed description when taken in conjunction with the accompanying drawings.

BRIEF DESCRIPTION OF THE DRAWINGS

FIG. 1 is a perspective view of a typical universal joint equipped with a new and improved cross incorporating the unique features of the present invention.

FIG. 2 is a perspective view of the cross with certain parts of the cross being shown in an exploded manner.

FIG. 3 is an enlarged fragmentary cross-section taken substantially along the line 3—3 of FIG. 1.

FIG. 4 is a view similar to FIG. 3 but shows a modified cross.

FIG. 5 is also a view similar to FIG. 3 but shows yet another modified cross.

DETAILED DESCRIPTION OF THE PREFERRED EMBODIMENTS

For purposes of illustration, the invention is shown in the drawings as incorporated in a universal joint 10 having a cross 11 and having two right angular yokes 13 which are interconnected by the cross, each yoke being adapted for connection to a rotary shaft 14. The cross 11 comprises a central body 15 (FIG. 2) and further comprises four bearing assemblies 16 spaced angularly around and projecting outwardly from the body. One of the yokes is connected to one pair of diametrically spaced bearing assemblies while the other yoke is connected to the remaining two bearing assemblies. Each yoke is formed with a pair of ears 17 having holes 18 (FIG. 3) for receiving the bearing assemblies.

Each bearing assembly 16 comprises a trunnion 19 (FIGS. 2 and 3) which is formed integrally with the body 15. Telescoped slidably over each trunnion is a bearing cup 20 which is defined by a tubular sleeve 21 (FIG. 3) and by an integral end wall 23 that closes the outer end of the sleeve. Each cup receives its respective trunnion with radial clearance and such clearance is taken up by an annular row of rollers 24 which are telescoped into the cup in surrounding relation with the trunnion so as to rotatably journal the cup on the trunnion. A ring 25 of elastomeric material is fitted around the open end of each cup and retains the rollers in the cup, the ring also serving as a lubricant seal.

In order to connect the cross 11 with the yokes 13, the bearing cups 20 are removed from the trunnions 19 to enable the trunnions to be slipped through the holes 18 in the ears 17 of the yokes. The bearing cups 20 then are inserted into the holes 18 and are telescoped over the trunnions 19. Thereafter, a snap ring 26 (FIGS. 2 and 3) is placed in an annular groove 27 formed around the outer side of each cup. The snap rings engage the inner faces of the ears 17 of the yokes 13 and prevent the bearing cups 20 from shifting outwardly relative to the yokes.

Inward shifting of the bearing cups 20 is limited by the outer ends of the trunnions 19. To reduce wear and to maintain a proper drive, the bearing cups should be prevented from sliding relative to the trunnions and thus there should be virtually no end play or clearance between the bearing cups and the outer ends of the trunnions. Also, there should be no axial pressure between the bearing cups and the ends of the trunnions. Accumulation of permissible tolerances, however, makes it difficult to manufacture the universal joint 10 in such a manner that each bearing cup will axially contact but will not press against the end of its respective trunnion. In other words, there are certain tolerances allowed in the distance between the inner faces of the ears 17 of each yoke 13, in the length of each trunnion 19, in the width of each snap ring 26 and snap ring groove 27 and in the distance between the outer wall of each snap ring groove and the end wall 23 of each cup 20. Even though the components of the universal joint are manufactured in a precise manner, the cumulative effect of the permissible tolerances can result either in axial end play between the bearing cups and the trunnions or in the bearing cups pressing too tightly against the trunnions.

In accordance with the present invention, each bearing cup 20 is provided with a unique pillow 30 which is adapted to engage the end of the respective trunnion 19 to limit inward sliding of the cup and which may be adjusted to take up axial end play between the cup and the trunnion while avoiding axial pressure between the two. Preferably, the pillow 30 of the present invention is formed by the inner end of a stud 31 which is threaded along its entire length. Each stud is screwed into a threaded hole 33 in the end wall 23 of the respective cup 20 and is formed with a slot 34 or other opening in its outer end to receive the blade of a screwdriver or the like.

With the foregoing arrangement, the studs 31 may be turned and adjusted after the bearing cups 20 have been inserted into the holes 18 in the yokes 13 and have been secured in place by the snap rings 26. Each stud is adjusted until its inner end 30 just contacts the outer end of the respective trunnion 19. Thus, each stud takes up the axial clearance between the trunnion 19 and the bearing cup 20 to prevent end play and yet does not apply heavy axial pressure to the trunnion.

To hold each stud 31 in its adjusted position when the universal joint 10 is in service use, a lock nut 35 is threaded onto the outer end portion of the stud. After the stud has been properly adjusted, the lock nut is tightened until its inner face is jammed against the outer side of the end wall 23 of the cup 20. Accordingly, the lock nut prevents the stud from turning after the stud has been adjusted. If the stud should require adjustment after the universal joint has been placed in use, the lock nut may be loosened to permit such adjustment.

A modified arrangement is shown in FIG. 4 in which the need for the lock nut 35 is eliminated. In this embodiment, the stud 31, after being adjusted, is prevented from turning by staking the stud at 36, or in other words, by deforming either the threads of the stud, the threads of the hole 33 or both to hold the stud against turning.

Still another arrangement is shown in FIG. 5 in which the stud 31 is held against turning by a pin 37 such as a roll pin adapted to extend through a hole 39 in one of the ears 17 of the yoke 13. After the stud has been adjusted, a radially extending hole 40 is drilled through the end wall 23 of the bearing cup 20 and another hole 41 is drilled into one side of the stud, the holes 40 and 41 being alined with the hole 39. The roll pin 37 then may be pressed into the holes to prevent the stud from turning.

From the foregoing, it will be apparent that the present invention brings to the art a new and improved universal joint cross 11 in which an adjustable stud 31 is uniquely incorporated into each bearing cup 20 to prevent end play between the cup and the associated trunnion 19. The embodiment shown in FIGS. 1 to 3 is advantageous in that the stud can be re-adjusted after the universal joint 10 has been placed in service use. The embodiments shown in FIGS. 4 and 5 are advantageous in that they each allow the use of a shorter stud whose outer end need not project any substantial distance from the end wall 23 of the bearing cup 20.

I claim:

1. A universal joint cross having a central body, four trunnions spaced angularly around and extending outwardly from said body, a bearing cup telescoped over each trunnion and having an end wall located adjacent the outer end of the trunnion, and an annular row of rollers located within each bearing cup and surrounding each trunnion, said cross being characterized by a stud threaded into the end wall of each bearing cup and having an inner end disposed in engagement with the outer end of the respective trunnion, and means for preventing each stud from turning relative to its respective bearing cup, said means comprising a pin extending radially through each bearing cup and projecting into a hole in the respective stud.

* * * * *